United States Patent
Rass et al.

(10) Patent No.: US 9,722,512 B2
(45) Date of Patent: Aug. 1, 2017

(54) METHOD FOR CONTROLLING AN INERTIAL DRIVE

(75) Inventors: Christoph Rass, Oldenburg (DE); Axel Kortschack, Oldenburg (DE)

(73) Assignee: SmarAct Holding GmbH, Oldenburg (DE)

( * ) Notice: Subject to any disclaimer, the term of this patent is extended or adjusted under 35 U.S.C. 154(b) by 649 days.

(21) Appl. No.: 14/005,195

(22) PCT Filed: Feb. 28, 2012

(86) PCT No.: PCT/EP2012/053347
§ 371 (c)(1),
(2), (4) Date: Feb. 20, 2014

(87) PCT Pub. No.: WO2012/123251
PCT Pub. Date: Sep. 20, 2012

(65) Prior Publication Data
US 2014/0152147 A1  Jun. 5, 2014

(30) Foreign Application Priority Data

Mar. 14, 2011 (DE) .......................... 10 2011 013 814
Feb. 27, 2012 (DE) .......................... 10 2012 202 945

(51) Int. Cl.
*H02N 2/00* (2006.01)
*H02N 2/06* (2006.01)
*H02N 2/02* (2006.01)
*H02N 2/10* (2006.01)

(52) U.S. Cl.
CPC .............. *H02N 2/06* (2013.01); *H02N 2/067* (2013.01); *H02N 2/025* (2013.01); *H02N 2/101* (2013.01)

(58) Field of Classification Search
CPC  H02N 2/02; H02N 2/025; H02N 2/04; H02N 2/06; H02N 2/067
USPC .................................................. 310/317, 328
See application file for complete search history.

(56) References Cited

U.S. PATENT DOCUMENTS

| 6,140,750 A | 10/2000 | Ueyama |
| 6,194,811 B1 | 2/2001 | Shinke et al. |
| 6,218,764 B1 | 4/2001 | Yoshida et al. |

(Continued)

FOREIGN PATENT DOCUMENTS

| DE | 42 37 509 A1 | 5/1994 |
| DE | 10 2006 048 238 A1 | 5/2007 |

(Continued)

OTHER PUBLICATIONS

Breguet, "Actionneurs "Stick and Slip" Pour Micro-Manipulateurs," Thèse No. 1756, École Polytechnique Fédérale de Lausanne, 1998, 164 pages.

(Continued)

*Primary Examiner* — Derek Rosenau
(74) *Attorney, Agent, or Firm* — Seed IP Law Group LLP

(57) ABSTRACT

A method for controlling an inertial drive on the basis of pulse trains is disclosed. The pulse trains include pulses having sections of different gradients and having variable amplitude and/or frequency. A pulse interval occurs between the individual pulses, wherein the selected pulse duration is so short that is substantially less than the cycle duration of the natural oscillation of the system to be driven.

18 Claims, 13 Drawing Sheets

(56) References Cited

U.S. PATENT DOCUMENTS

| | | | |
|---|---|---|---|
| 6,433,459 B1* | 8/2002 | Okada | H02N 2/067 310/316.03 |
| 6,545,389 B1* | 4/2003 | Yoshida | H02N 2/025 310/317 |
| 2002/0067105 A1* | 6/2002 | Kosaka et al. | H02N 2/163 310/323.16 |
| 2002/0084719 A1* | 7/2002 | Okamoto et al. | H02N 2/025 310/328 |
| 2003/0085633 A1 | 5/2003 | Marth | |
| 2005/0275315 A1 | 12/2005 | Manabe et al. | |
| 2006/0082253 A1* | 4/2006 | Hara | H02N 2/062 310/317 |
| 2008/0191583 A1 | 8/2008 | Bohn | |
| 2009/0135683 A1* | 5/2009 | Mizuno et al. | H02N 2/025 310/333 |
| 2010/0314970 A1 | 12/2010 | Culpi et al. | |
| 2011/0304241 A1 | 12/2011 | Voigtlaender et al. | |
| 2011/0317287 A1 | 12/2011 | Aoki et al. | |
| 2011/0317292 A1 | 12/2011 | Kuwano et al. | |
| 2014/0132112 A1 | 5/2014 | Kortschack et al. | |

FOREIGN PATENT DOCUMENTS

| | | |
|---|---|---|
| DE | 10 2009 013 849 A1 | 9/2010 |
| EP | 0 750 356 A1 | 12/1996 |
| EP | 0 823 738 A2 | 2/1998 |
| EP | 2 006 995 A1 | 12/2008 |
| WO | 93/19494 A1 | 9/1993 |
| WO | 2007/144251 A1 | 12/2007 |
| WO | 2010/088937 A1 | 8/2010 |
| WO | 2010/098138 A1 | 9/2010 |
| WO | 2010/113505 A1 | 10/2010 |
| WO | 2012/123251 A1 | 9/2012 |
| WO | 2012/130555 A1 | 10/2012 |

OTHER PUBLICATIONS

Breguet et al., "Stick and Slip Actuators: design, control, performances and applications," *International Symposium on Micromechatronics and Human Science*, pp. 89-95, 1998.

German Search Report, dated Oct. 15, 2012, for German Application No. 10 2012 004 294.9, 7 pages.

German Search Report, dated Oct. 18, 2012, for German Application No. 10 2012 004 401.1, 6 pages.

International Search Report and Written Opinion, mailed Mar. 31, 2014, for International Application No. PCT/EP2013/054258, 9 pages.

International Search Report and Written Opinion, mailed Jun. 10, 2013, for International Application No. PCT/EP2013/054264, 9 pages.

Pohl, "Dynamic piezoelectric translation devices," *Rev. Sci. Instrum.* 58(1):54-57, 1987.

* cited by examiner

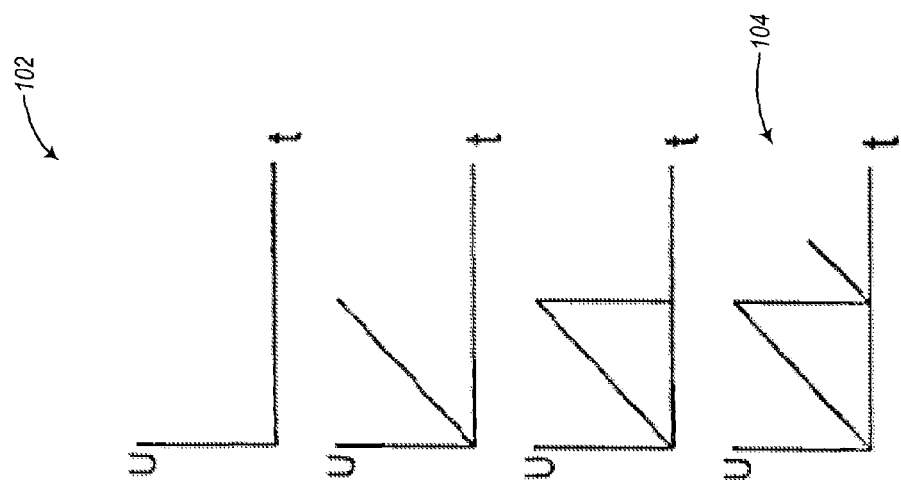
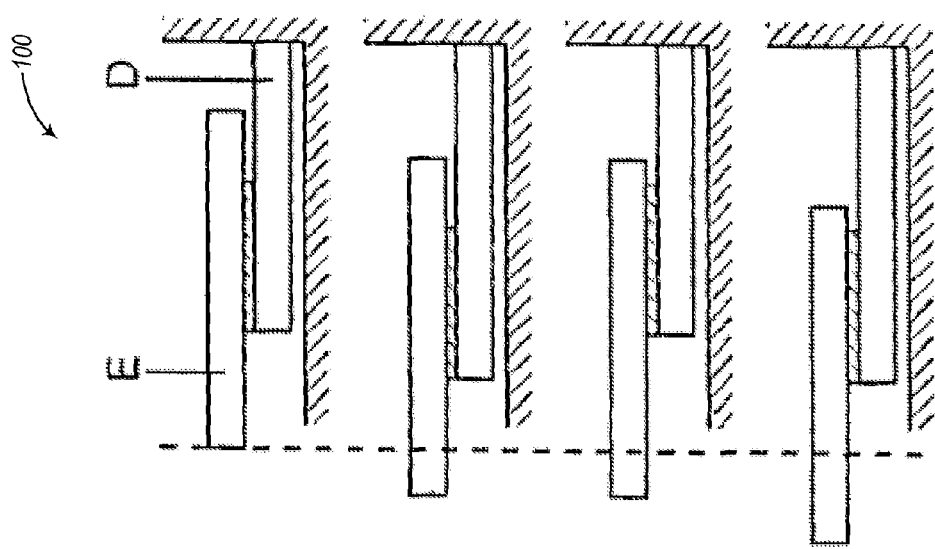
Fig. 1A
Fig. 1B (Prior Art)

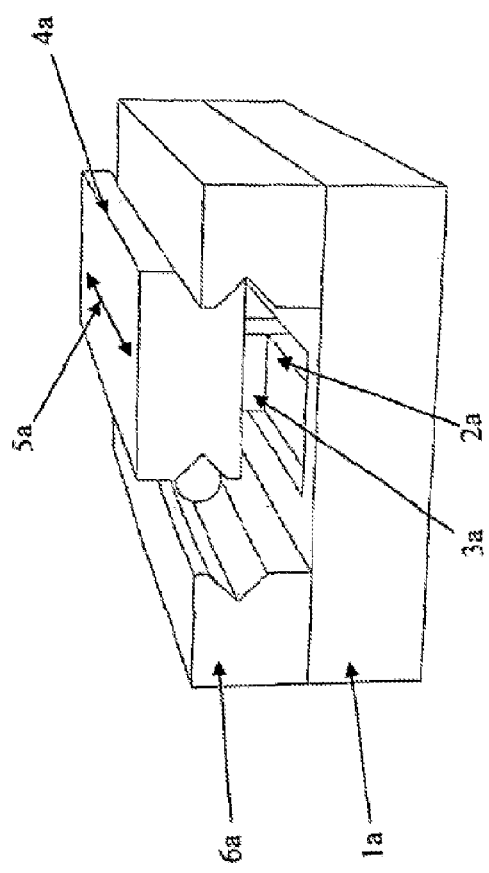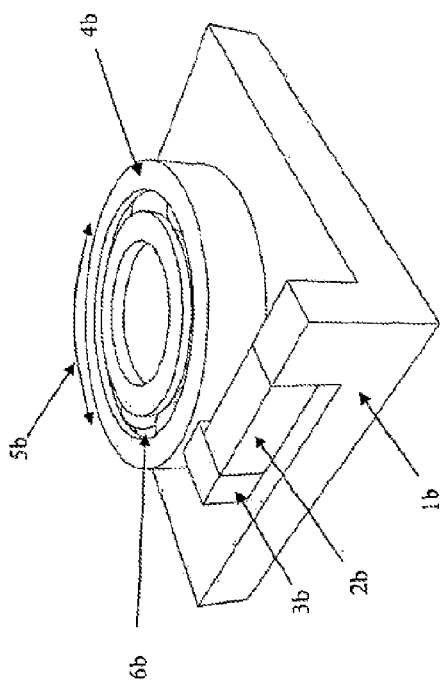
Fig. 3A
Fig. 3B

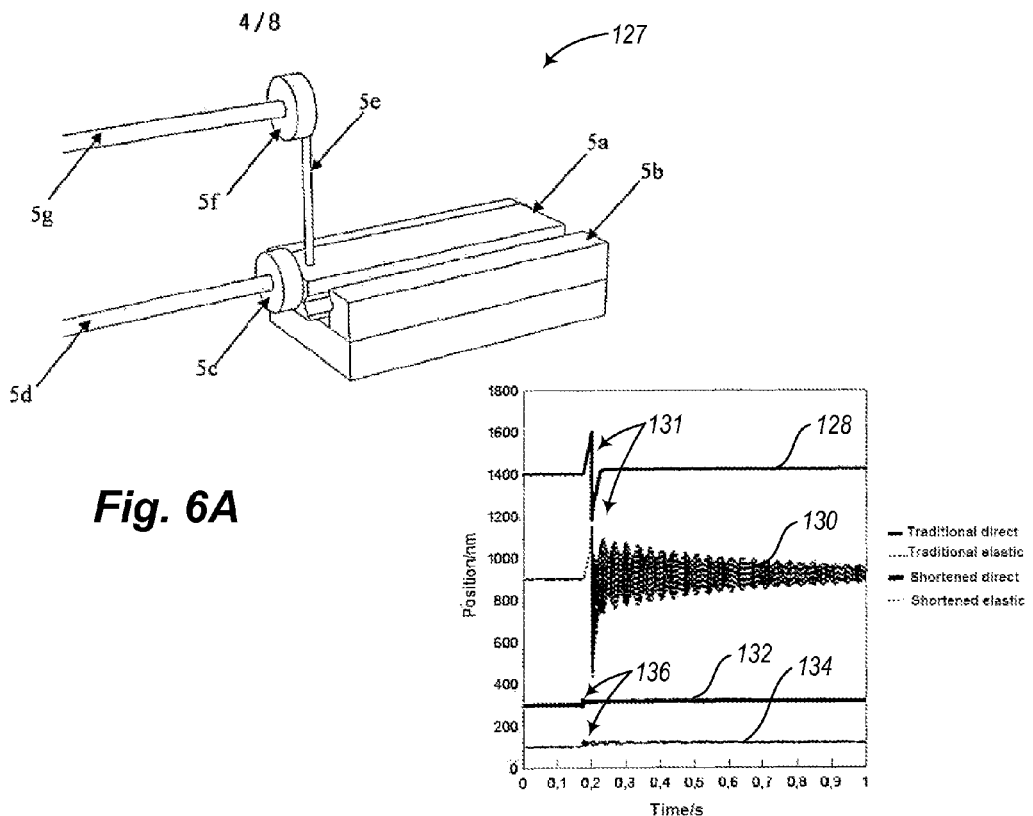
Fig. 6A
Fig. 6B
Comparison of traditional and shortened parabolas
Same scale, arbitrary offset
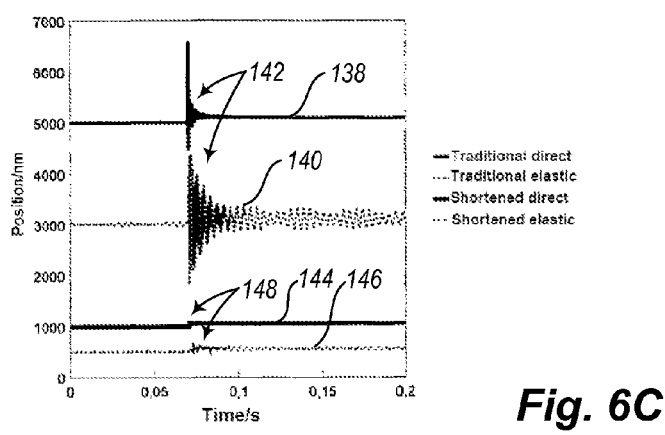
Fig. 6C

METHOD FOR CONTROLLING AN INERTIAL DRIVE

RELATED APPLICATION

This patent application claims benefit under 35 U.S.C. §119(e) of International Patent Application No. WO 2012/123251A1, filed Feb. 29, 2012, and German Patent Application 10 2011 013 814.5, filed Mar. 14, 2011, which are hereby incorporated by reference in their entireties.

BACKGROUND

Technical Field

The disclosure relates to a method for controlling an inertial drive on the basis of pulse trains having variable amplitude and/or frequency Description of the Related Art Providing inertial drives, for example piezoelectric stick-slip drives, with electrical signals having a flat and a steep edge in the manner of a sawtooth voltage waveform is known from the prior art.

When the flat signal edge or ramp voltage is applied, the friction member of the drive entrains the slider. When the steep edge is active, slip occurs between the friction member and the slider. On the next flat edge of the pulse train, the friction member is again made capable of entraining the slider.

It has been found that a desired degree of slip between the friction member and the slider is rarely achieved. For example, the slider is entrained a part of the way, the amount of that part being dependent on the force exerted by the actuator, on the mass of the slider, on elasticities in the material and on external forces.

When very small steps are made, the distance moved backwards is greater not only in relation to the step size, but also in absolute terms, with the result that a reduction in the step size leads to an increase in undesired vibrations of the drive.

When the amplitudes of the sawtooth voltage are small, the backwards motion is very much greater on the steep edge than the step itself that is performed. When the amplitude drops below a minimum value, the system being driven does not perform usable steps.

This means that, when controlling a stick-slip drive with a normal sawtooth voltage as known from the prior art, the vibration amplitude is not dominated by the step size itself when the step sizes are small, but rather by the amount of backwards slip on the steep edge of the pulse.

The principle of inertial drives can be seen from FIG. 1. In such drives, an actuator D is provided to which a periodic, sawtooth-like signal is applied, and which produces an acceleration relative to a displaceably mounted runner E frictionally connected to the actuator. When the acceleration of the actuator is low, the runner follows the actuator due to frictional engagement. When the acceleration of the actuator is high, in contrast, the runner slips relative to the actuator as soon as the inertial force of the runner is greater than the frictional force between the runner and the actuator. Macroscopic movements can be realized when a plurality of steps are performed. Inertial drives are a mechanically simple way to position objects over larger distances with high movement resolution.

The direction of motion of the runner can be predefined using the polarity of the sawtooth waveform.

These drives have the disadvantage that vibrations, which are disruptive for high-precision operations, occur again and again due to stepping.

Inertial drives can be controlled with signals having different waveforms. It is important that a high-acceleration phase is followed by a low-acceleration phase in the opposite direction.

A very common waveform is shown in FIG. 2, waveform A. This is a classic sawtooth wave, with alternating flat and steep edges.

The other waveforms B-F in FIG. 2 are control signals typical of the kind used in inertial drives. EP 0 823738 A2 shows two different waveforms.

A common feature of known control signals is that they couple-in disruptive vibrations when moving an object. Even small steps produce large vibrations when known control signals are used.

BRIEF SUMMARY

In view of the foregoing, it is advantageous to specify an improved method for controlling an inertial drive on the basis of pulse trains having a sawtooth waveform, for example, and having variable amplitude and/or frequency, wherein extremely small step sizes below 5 nm can be realized and wherein it is also possible to minimize undesired vibrations of the system to be driven, or of an object coupled thereto, such as a needle-shaped object. Such an improved method is set forth in claim 1; the dependent claims specify variants and developments of the method that are at least appropriate.

According to the method disclosed herein, the vibration amplitude is reduced by changing the pulse train control signal to pulses with pulse intervals.

During the pulse interval, it is not imperative that an unchanging signal be supplied. For example, it is quite possible to supply a continuously changing signal in order to achieve a continuous movement of the drive. It is also possible to supply situation-dependent waveforms so that desired movements can be achieved during the pulse duration.

The duration of the shortened control pulse is so short that it is substantially less than the cycle duration of the natural oscillation of the system to be driven.

For example, if classic sawtooth signals of the kind used for inertial drives are used for control purposes, the individual sawtooth pulse of the pulse train comprises not only a slow and a fast edge, but a sequence consisting of a slow edge, a fast edge and a slow edge, in the sense of a shortened sawtooth pulse. The definition of the slow edge should be understood to mean that no slip between the runner and the friction member is triggered. The slow edge may be shortened down to the single-digit microsecond range, or even lower.

In one embodiment, since the duration of the control pulse is less than the cycle duration of the natural oscillation of the system to be driven, the runner can no longer follow the sawtooth. However, a movement step is performed due to material elasticities that are ubiquitously present. The size of the step is less than would result for substantially slower pulses of the same amplitude. For the runner, the step acts like a spontaneous step to a different position, so it responds with a typical step response, in which the amplitude of oscillation is almost linearly dependent on the size of the step. The duration of a shortened pulse can then be kept constant for further operation, the step frequency being determined by the length of the pause between steps. However, there is nothing to prevent the step duration being dynamically adjusted to operating conditions.

The comparison between classic pulse trains and shortened pulses shows that the amplitude of vibrations in classic pulse trains increases as the step size decreases. When the control pulse is shortened, in contrast, the vibration decreases linearly in proportion to the step size, so the shortened pulse is suitable, in particular, for achieving the small step sizes.

It should be emphasized that the principle of shortened pulse trains can be applied not only to classic sawtooth waveforms for controlling inertial drives, but also to other waveforms suitable for controlling inertial drives, such as parabolic waveforms. It is also possible to select extreme variants of a sequence of slow edges and fast edges in the form of a square wave signal, i.e., waveforms that are not reconcilable with classic stick-slip inertial drives because a significant movement portion during reversal of the direction of motion of the actuator does not result from a sequence of stick and slip, but from a sequence of slipping movement in different directions. It is also important in this regard that the duration of the control pulse is so short that it is substantially less than the cycle duration of the natural oscillation of the system to be driven.

In the description that follows, the interrelationships in question shall be explained with reference to a sawtooth signal for the sake of simplicity. The shortened control pulses can also be applied to the other waveforms suitable for inertial drives and to other waveforms comprising a sequence of slow and fast edges.

To briefly summarize at this point, the method disclosed herein entails providing a pulse interval between the individual pulses, the selected pulse duration being less than the cycle duration of the natural oscillation of the system to be driven.

If the duration of the control pulse is kept constant, the step frequency of the drive can be determined by the variable length of the pulse intervals.

If the sawtooth waveform is used, the result is a pulse, to be preferably used in the pulse train, comprising a sequence with slowing rising, rapidly falling and then slowing rising edges. If the drive is to move in the opposite direction, the polarity of the edges must be reversed.

The amplitude values can be readjusted to keep the step size constant. Small step sizes are maintained by dynamically controlling the amplitudes.

Due to the novel, linear relationship between vibration and step size, or amplitude, it can now make technical sense to use very small steps, down to the minimum amplitude at which steps can still be performed. If the step size is less than the desired step size, the step size can be increased by increasing the amplitude. If the step size is too large, the amplitude is reduced by a certain amount. Near the minimum amplitudes, the inertial drive is very sensitive to factors such as external forces, fluctuations in force due to production imprecision, etc. For that reason, a control loop for operating close to the minimum amplitudes is very advantageous.

A fast control loop prevents the drive from getting stuck. If the step size is zero, due to small control signal amplitudes, the voltage must be increased until the runner breaks loose and starts to move again. If the voltage is increased slowly, the final voltage at which the drive breaks loose is high—which means the drive has jammed. As a result, the drive begins, also after breaking loose, by making a relatively large step, but if there is a prompt response from a control loop there is no need to overcome a high breakaway voltage. This means that step sizes down to zero can be used.

Such a control loop thus allows very small steps, which change linearly with the control amplitude, to be performed with the drive. Hysteresis, which occurs in the absence of a control loop and which renders high-resolution movement impossible, can be prevented.

The speed of the drive can be set using the product of the step frequency and the step size, wherein regions in which the system to be driven is expected to vibrate strongly are filtered out by selecting the step size accordingly.

The novel proportional relationship between the step size, triggered by the control pulse, and the size of the resultant vibrations in the case of small steps, makes this an appropriate approach, because disruptive vibrations no longer occur when step sizes are small, in contrast to what was hitherto the case. By using the control pulse, it is possible to achieve significantly reduced vibration when small steps with a suitable frequency are chosen for slow speeds. When controlling the drive with traditional control signals, selecting small step sizes would even be qualitatively disadvantageous.

Mechanical properties of the system to be driven, including the coupled object, can be compensated by pulse asymmetry in the respective pulse trains used for control. It has been found in the case of fast steps that the amplifier electronics, actuators and mechanics of the drive that are normally present are unable to follow the steps perfectly, thus distorting the symmetry of the step signal in the way that it acts mechanically on the frictional contact. However, deviation from said symmetry tends to cause an increase in vibration amplitude. This effect is countered, by deliberately introducing asymmetry in the control pulse. This compensation can be achieved statically, as the distortions occurring within the system are almost identical for each step.

When the direction is reversed, and if the amplitude of the pulse train remains constant, the first steps in the respective new direction are substantially larger compared to the case in which movement in this new direction has continued for some time already.

The step size decreases progressively until the same step size as before the reversal in direction is reached.

This undesired effect can be compensated by adjusting the amplitude used for the steps. When the direction of movement is reversed, the amplitude is reduced, after which the amplitude is then progressively adjusted until it reaches the original value again. This compensation may be performed anticipatively, as said effect occurs substantially identically at every reversal of direction.

The amplitude to be set for the control signals is frequency-dependent, meaning there is dependence on the natural resonance frequencies of the positioner, which are manifested in distinctive peaks and troughs in the control amplitude that is necessary to drive the runner with constant step sizes. The natural resonance frequencies are influenced by mounting or by the mounted position of the positioner in the system as a whole and varies from apparatus to apparatus.

This dependence on frequency can be detected, stored and compensated accordingly with the aid of a position sensor, as part of a calibration procedure. This allows the control voltages and frequencies to be systematically matched with each other, so that the step sizes remain constant, even without an integrated displacement sensor, when moving through the frequencies.

When an amplitude is readjusted, in such a way that the step size remains constant, smaller step sizes become technically usable. Externally acting forces and internal variations in forces are compensated by the amplitude control loop. The controlled is embodied in such a way that jamming of the drive is prevented.

As is known, the speed of an inertial drive is obtained as the product of the step frequency and the step size, the step size being dependent on the amplitude of the controlling pulse train. The desired speed can therefore be achieved with different combinations of step frequency and step size.

Prior art control loops use either a constant amplitude, often a maximum amplitude, or use different amplitudes for different speed ranges.

In order to achieve small step sizes when desired, a novel means of controlling step frequency and step size is provided. The aim here is to set the amplitude in such a way that ranges are avoided in which vibrations are triggered by steps with a frequency lower than the resonance frequency of the positioner. The amplitudes of these disruptive vibrations increase with increasing step size. Step frequencies well above the resonance frequency of the positioner trigger weak vibrations, however.

In one embodiment, the range causing strong vibrations is circumvented, in contrast to the prior art, which is based on classic approaches to control. This means that the control pulses are chosen with a small amplitude when the drive is to move slowly. The faster the movement is meant to be, the higher the frequency. When the frequency has reached a frequency which is significantly higher than the resonance frequency, the amplitude is increased. The amplitude may be increased, or, alternatively, the frequency and the amplitude may be increased together. It is still possible to use the shortened steps when doing so, although it is also possible in the fast range to switch to normal control signals, e.g., to control signals of prior art inertial drives.

If slow, continuous movement of the drive is to be achieved, scanning motion and stepped motion may be superimposed. The scanning motion results from semi-static control that changes slowly in comparison with the edges of the step. Superimposition may be realized in such a way that a step is performed as soon as the scanning motion has reached a threshold value. After the step, the voltage applied to the actuator is again at such a level that scanning can start anew.

The shortened pulses for controlling the actuators may be supplied to a single actuator that drives a runner, also called a slider.

It is also possible that a plurality of actuators drive a runner together, e.g., when the runner must be driven with a greater force than a single actuator is able to provide.

It is possible in this regard to synchronize the signals of the various actuators. One variant would be that the actuators have the same control signals supplied to them at the same time, whereas another variant is to control the various actuators with timing offsets using respective shortened pulses according to the invention. The latter variant has the advantage that such a positioning system allows particularly uniform and strong movement of the runner. Due to the elasticities in the individual actuators and the mechanics, it is possible to have the actuators act with a timing offset on the runner, without mechanical stresses that are too high for any uniform movement being produced between the friction surfaces of the individual actuators and the runner.

With the short control signal, the drives can perform low-vibration steps that are very much smaller than has been common hitherto. This also allows slower speeds with a high step frequency to be applied, if small enough steps are selected. It is thus possible, for example, to use a wide range of speeds while keeping the step frequency above the audible range. This results in noiseless operation of the drives.

If the speeds in the high-frequency range are still too high for an application, the frequency can then be reduced as well. This does not generally produce annoying levels of noise, as the drives can then be controlled with very small amplitudes, and very slight, noise-producing vibrations may occur due to the short step pulse.

BRIEF DESCRIPTION OF THE SEVERAL VIEWS OF THE DRAWINGS

The method shall now be described in greater detail with reference to an embodiment and with the aid of Figures, in which FIG. 1 shows a schematic sketch of an inertial drive with a typical corresponding sawtooth control.

FIG. 3A shows a simplified view of a linear inertial drive.

FIG. 3B shows a simplified view of a rotary inertial drive.

FIG. 6A shows a simplified sketch of the experimental set-up for measuring the vibrations directly on the runner and on a reference object that is an elastically suspended in an unfavorable manner for vibrations.

FIG. 6B shows a comparison of the vibrations triggered by a 20-nm step with a classic sawtooth pulse as shown in the upper one of the two curves, and by a shortened sawtooth pulse as shown in the lower one of the two curves, according to one embodiment described herein.

FIG. 6C shows a comparison of the vibrations triggered by a 100-nm step using a classical parabolic signal waveform as shown in the upper two curves and using a shortened parabolic pulse train according to one embodiment described herein as shown in the lower curves.

DETAILED DESCRIPTION

FIG. 1 shows a schematic sketch of a prior art inertial drive 100 with typical corresponding sawtooth control 102. In such drives, an actuator D is provided to which a periodic, sawtooth-like signal 104 is applied, and which produces an acceleration relative to a displaceably mounted runner E frictionally connected to the actuator D.

Figure 2:
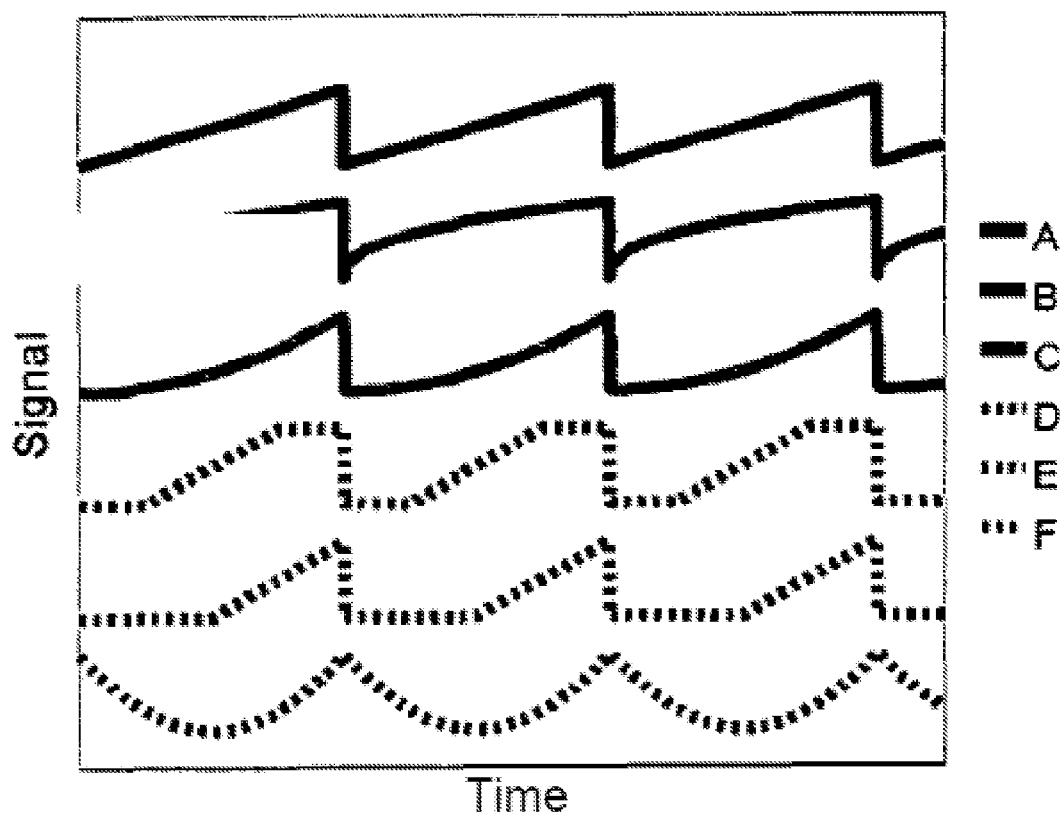
FIG. 2 shows examples of prior art signal waveforms for controlling inertial drives.

FIG. 2 shows a selection of typical sawtooth waveforms used for inertial drives. An important criterion is that high-acceleration phases alternate with low-acceleration phases.

Waveform A: Classic sawtooth
Waveform B: Exponential pulse train
Waveform C: Parabolic pulse trains with cliff
Waveform D: Sawtooth with intervals
Waveform E: Sawtooth sequence with intervals between the sawteeth
Waveform F: Parabolic curve.

FIG. 3A shows a simplified linear inertial drive, including the typical components, namely the base 1a, an actuator 2a mounted on the base and controlled by the sawtooth signal, and the friction surface 3a on the actuator. The friction surface 3a is in constant friction contact with the runner 4a. The runner can be moved in direction 5a by controlling the actuator 2a accordingly. In this Figure, the runner 4a is guided by a guide 6a.

FIG. 3B shows a simplified rotary inertial drive, including the typical components, namely the base 1b, an actuator 2b mounted on the base and controlled by the sawtooth signal, and the friction surface 3b on the actuator. The friction surface 3b is in constant friction contact with the runner 4b. The runner can be moved in direction 5b by controlling the actuator 2b accordingly. In this Figure, the runner 4b is guided rotationally by a bearing 6b.

Figure 4:
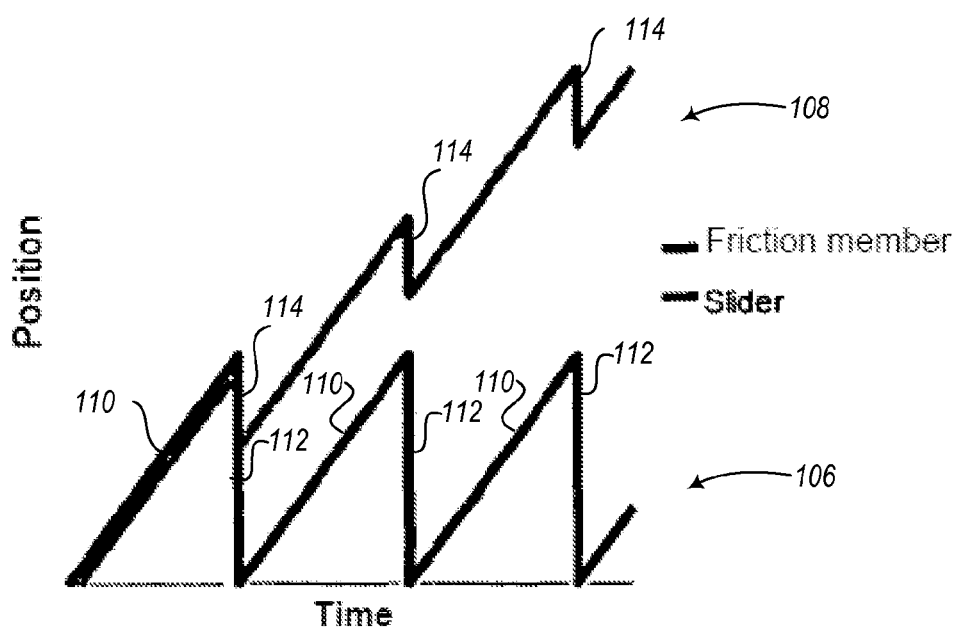
FIG. 4 shows a typical movement of a friction member and a runner when controlled with sawtooth pulses according to the prior art, for example.

It can be seen from the view shown in FIG. 4 how a friction member 106 entrains a runner 108. The desired entrainment of the runner 108 is achieved on the rising flat edge 110 of the pulse. On the steep, falling edge 112, slip 114 occurs between the friction member 106 and the runner 108, although this slip 114 is not total. Rather, the runner is always pulled back a certain distance. When small steps are desired, the distance moved undesiredly backwards is greater not only in relation to the step size, but also in absolute terms, with the result that a reduction in the step size leads to an increase in undesired vibrations of the driven object.

Figure 5A:
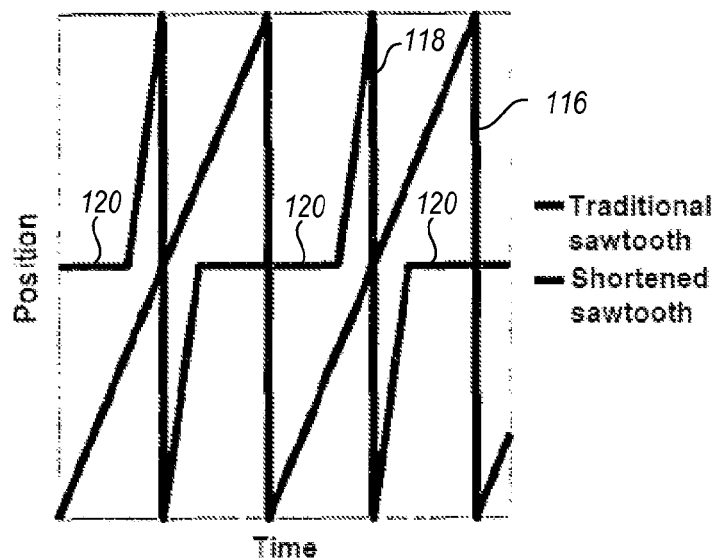
FIG. 5A shows a comparative view of a normal sawtooth pulse, with a shortened sawtooth according to one embodiment described herein, having a pulse duration which is shorter than the cycle duration of the natural oscillation of the system.

FIG. 5A illustrates the comparison of a traditional sawtooth pulse 116 and a shortened sawtooth pulse 118 according to one embodiment described. The differences in pulse duration are reduced so that both waveforms 116 and 118 can be shown in one diagram. In order to reduce the vibration amplitude, the control signal is changed to a sawtooth waveform with intervals 120, and the duration of the resulting shortened sawtooth pulse 118 is reduced to such an extent that it is substantially below the cycle duration of the natural oscillations of the positioner. The pulse durations of traditional sawtooth signals and the shortened sawtooth may well differ by several orders of magnitude.

Figure 5B:
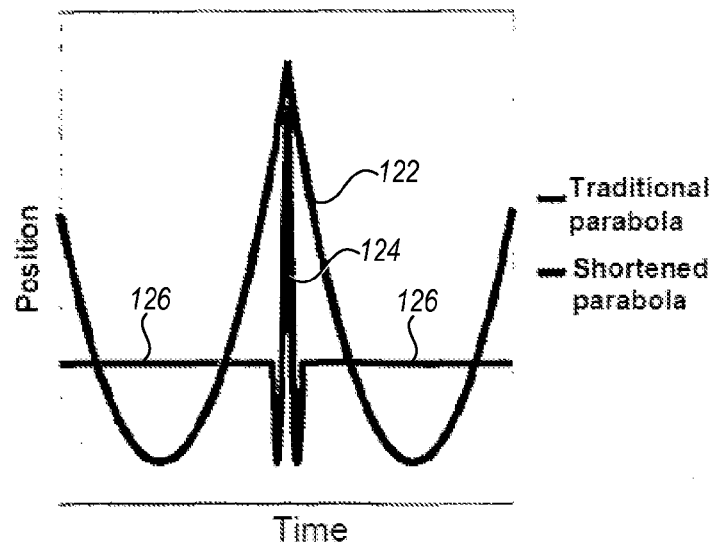
FIG. 5B shows a comparative view of a normal parabolic control signal, with a shortened parabolic step pulse according to one embodiment described herein, having a pulse duration which is shorter than the cycle duration of the natural oscillation of the system.

FIG. 5B illustrates the comparison of a traditional parabolic control signal 122 and a shortened parabolic waveform 124. In order to reduce the vibration amplitude, the control signal is changed to a pulse with intervals 126, and the duration of the shortened pulse is reduced to such an extent that it is substantially below the cycle duration of the natural oscillations of the positioner. The pulse durations of the traditional waveform and the shortened control signal may well differ by several orders of magnitude.

FIG. 6A, FIG. 6B, and FIG. 6C illustrate the effect of the shortened pulse trains, using sample measurements on an inertial drive, by comparing the latter with those obtained in the case of a traditional sawtooth waveform FIG. 6B and in the case of a traditional parabolic signal waveform FIG. 6C. To allow a direct comparison, the sawtooth waveforms and the parabolic waveforms for the control signals, traditional versus shortened were compared directly.

FIG. 6A shows a simplified sketch of an inertial drive apparatus 127.

A runner 5a guided inside the guide 5b is driven by supplying a sawtooth signal to the actuators. A small mirror 5c is mounted on runner 5a, the position of the mirror being monitored with the laser 5d of a laser interferometer.

To show the effect of oscillations of the runner 5a on an object which is coupled to the runner unfavorably in regard to vibrations, another mirror 5f is mounted on top of a thin rod 5e on the runner 5a. Since the rod 5e is thin and the mirror 5f has a relatively high mass, the mirror 5f can be easily made to vibrate. The movements of the mirror 5f are monitored using a second laser beam 5g of the laser interferometer.

FIG. 6B shows real measurements which were obtained using the experimental set-up 127 described above and shown in FIG. 6A.

In each case, the runner 5a was driven to perform a 20-nm step.

In the case of the upper two graphs 128 and 130, respectively, a traditional sawtooth signal 131 was used, whereas in the case of the lower two graphs, 132 and 134 respectively, a shortened sawtooth pulse 136 according to the invention was used.

The graph 128 shows clearly that the carriage converted only a very small portion of the movement performed by the actuator into a step 20 nm; most of the movement is merely oscillation of the runner 5a on the order of 400 nm.

The effect of the oscillation of the runner 5a on the mirror 5f is shown in the graph 130, where the mirror 5f can be observed oscillating with an amplitude of approximately 700 nm, followed by a long period of transient oscillations with a clearly discernible beat. If, instead of the mirror construction 5e+5f, a needle had been used in order to perform nanoscale manipulations, then such vibrations would have made it very difficult in practical terms to approach the object with fine steps.

As can be seen from FIG. 6B, the drive response is different when control is effected using the shortened sawtooth pulses 136 as disclosed herein.

In graph 132, the measured position is shown directly on the runner 5a. One can see a 20-nm step. The resolution of FIG. 5B is not sufficient to assess transient oscillations that may be present. It can be clearly seen that the oscillations are much less prominent than when a step is performed using a conventional sawtooth signal 131. The same is true for the vibration of the mirror 5*f*, shown in graph 134. The 20-nm step can be seen, followed by very small and rapid transient oscillations. This behavior is significantly better than when a conventional sawtooth 131 is used.

With such positioning behavior, a needle of the kind referred to above may be used very well for nano-manipulations.

FIG. 6*c* shows real measurements which were obtained using the experimental set-up 127 described above and shown in FIG. 6A.

The runner 5*a* was driven in each case using parabolic signals to perform a 100-nm step.

In the case of the graphs 138 and 140, a standard parabolic signal 142 was used, whereas in the case of the graphs 144 and 146, a shortened parabolic pulse 148 was used.

The graph 138 shows clearly that the carriage converted only a very small portion of the movement performed by the actuator into a step of size about 100 nm; most of the movement is merely oscillation of the runner 5*a* in the order of several microns.

The effect of the oscillation of the runner 5*a* on the mirror 5*f* is shown in the graph 140, where the mirror 5*f* can likewise be observed oscillating with an amplitude of several microns, followed by a long period of transient oscillations.

As can be seen from FIG. 6C, the situation is different when control is effected using the shortened parabolic pulse pulses 142 as disclosed herein.

In the graph 144, the measured position is shown directly on the runner 5*a*. One can see a 100-nm step. The resolution of FIG. 6C is not sufficient to assess transient oscillations that may be present. It can be clearly seen that the oscillations are much less prominent than in the case of a positioner driven with a normal parabolic signal 142. The same is true for the vibration of the mirror 5*f*, shown in the graph 146. The 100-nm step can be seen, followed by very small and rapid transient oscillations. This behavior is again significantly better than when a conventional parabolic signal is used.

Figure 7:
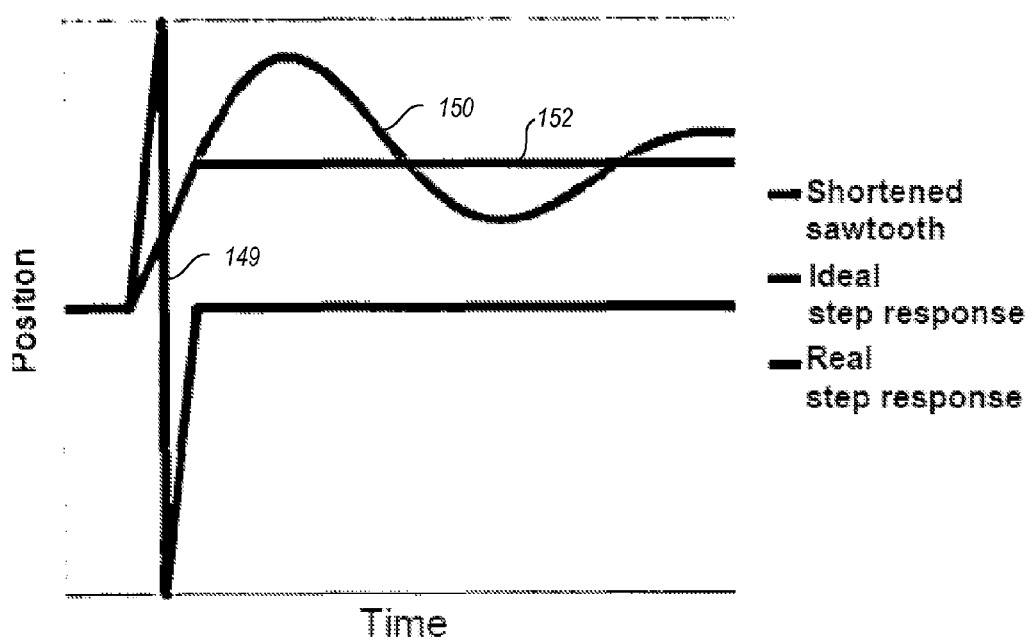
FIG. 7 shows a comparison of real and ideal step responses as responses of the driven system to a shortened sawtooth pulse according to one embodiment described herein.

FIG. 7 illustrates the response of the driven system to a shortened sawtooth pulse 149 as disclosed herein. The graph 150 shows the real step response, in comparison with the graph 152 representing the ideal step response.

Figure 8:
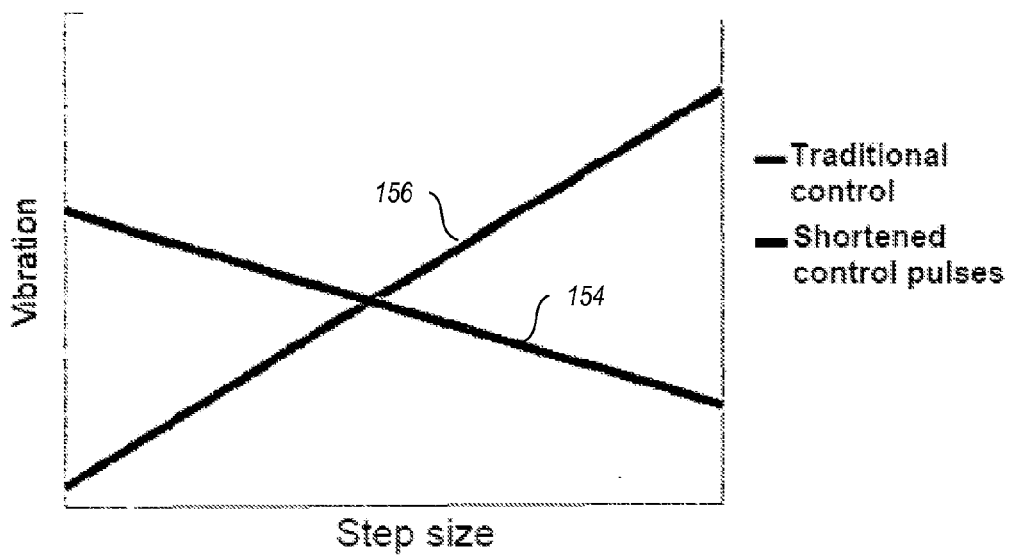
FIG. 8 shows a comparison of the vibrations of the drive when controlled using a classic sawtooth waveform and the vibrations occurring with a shortened sawtooth pulse according to one embodiment described herein.

FIG. 8 shows that the vibrations of an inertial drive driven with a traditional control signal become greater as the step sizes become smaller as shown in graph 154, which makes it technically impossible to use very small step sizes.

The situation is different when the inertial drive is controlled by the shortened control pulses. As can be seen from graph 156, the vibrations also become smaller when the step sizes become smaller, which makes it technically feasible to use small steps of the inertial drive.

Figure 9:
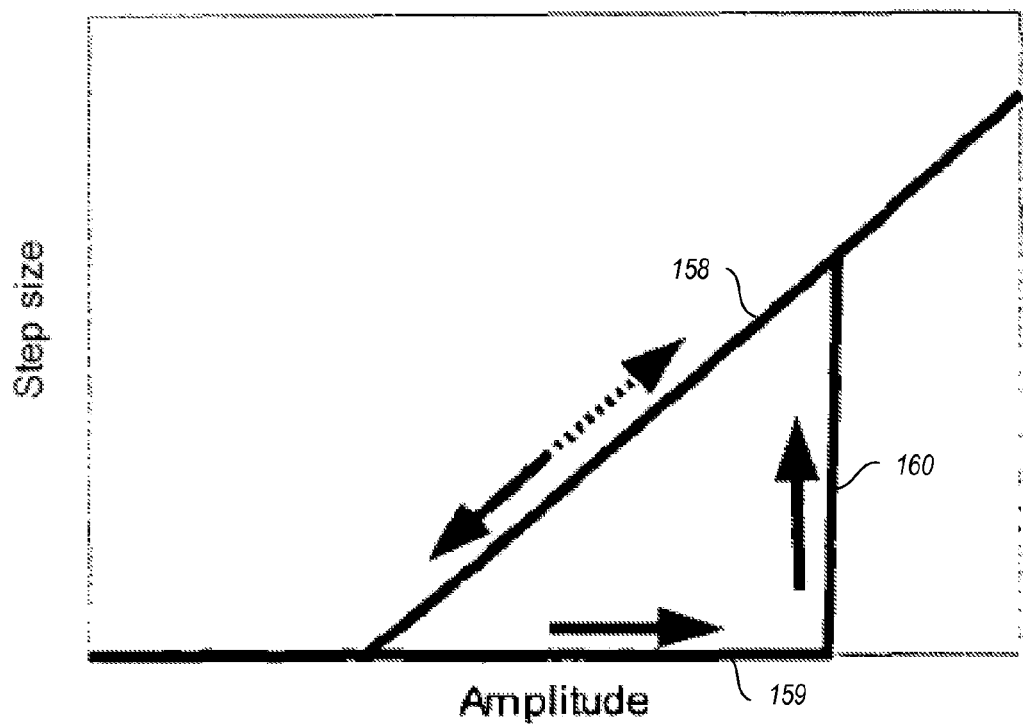
FIG. 9 shows a comparison of the variation in step size in relation to amplitude in the range of small steps, when a positioner jams due to lack of control being exercised, as indicated by black arrows, forming hysteresis, and the variation in step size when jamming is prevented by amplitude control, as indicated by the black-grey arrow showing a simple linear relationship.

FIG. 9 shows the typical behavior of an inertial drive at very small step sizes with and without amplitude control.

When the amplitude is reduced, the step sizes 158 become increasingly smaller until no step is performed. When the amplitudes are then increased again, steps are not performed again immediately; instead, the amplitude 159 must be increased until the drive performs a large, erratic step 160. As soon as such a step 160 has been performed, the step size 158 can be controlled again by varying the amplitude.

In the case of amplitude control, the step size 158 can be used continuously in a linear relationship down to a step size of zero, since the "jamming" described above is prevented by a fast control loop. No hysteresis occurs, so the small steps can be put to technical and meaningful uses.

Figure 10:
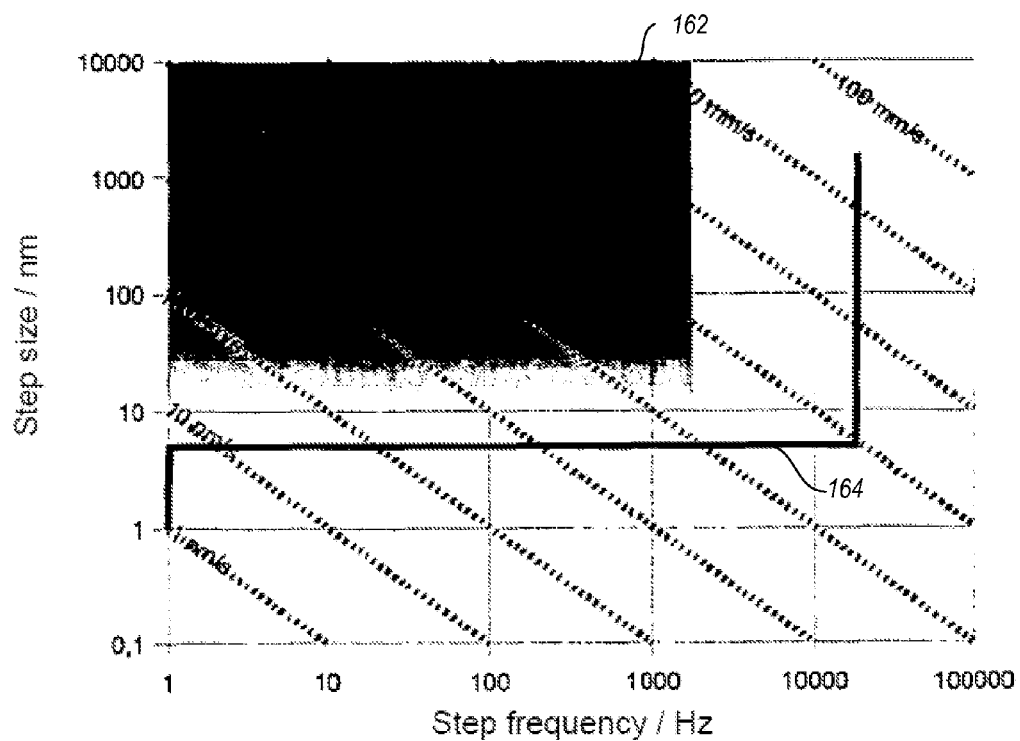
FIG. 10 shows a view of a filtered-out region of strong vibration, shown as shaded, with respectively selected step size and step frequency.

It can be seen from FIG. 10 how areas of strong vibrations indicated by a grey area 162 can be filtered out for a specimen positioner by selecting suitable step sizes and frequencies. The black line 164 is a possible control curve that avoids those combinations of step frequency and step size that result in overly strong vibrations.

Figure 11A:
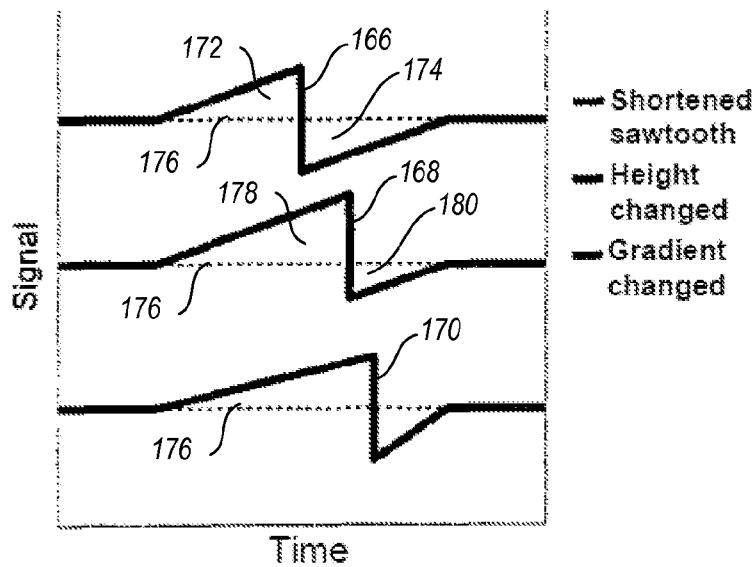
FIG. 11A shows a comparison of a symmetrical shortened sawtooth pulse according to the invention and two asymmetric shortened sawtooth pulses, likewise according to one embodiment described herein.

FIG. 11A shows three sawtooth pulses 166, 168, and 170, having different symmetries. The topmost pulse shows a symmetrical sawtooth control signal 166. The areas 172 and 174 enclosed by the sawtooth control signal 166 and the average value 176 are identical above and below the average value 176 of the sawtooth control signal 166.

In the two other waveforms 168 and 170, the areas above and below the average value differ. For example, the area above the average value, 178, is larger than the area below the average value, 180. Asymmetry can also be produced in the other direction in which the area below the average value is greater.

It can be shown that asymmetry can be produced using various methods. For the middle case 168, the asymmetry is set using different amplitude levels, whereas in the bottom case 170, asymmetry is produced using different edge gradients.

Such asymmetry can compensate for the fact that the amplifier electronics, the actuators and the mechanics might not be able to follow a fast step perfectly, which then lead to asymmetric behavior at the point of friction, which leads in turn to undesired vibrations.

Figure 11B:
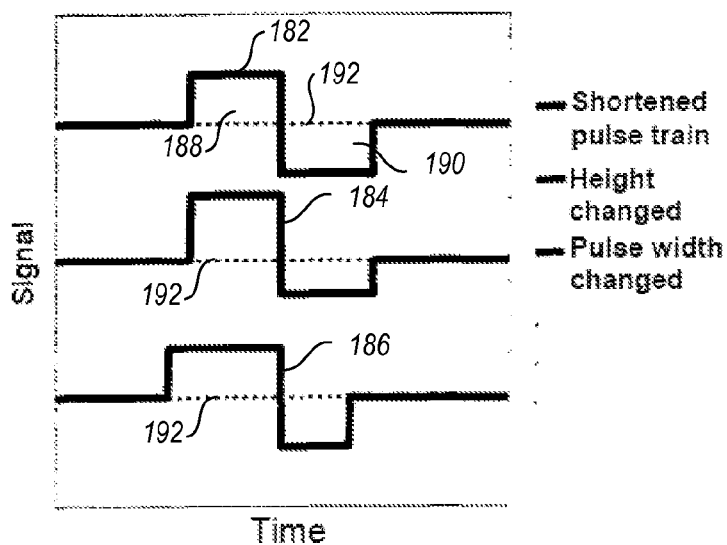
FIG. 11B shows a comparison of a short square wave signal according to one embodiment described herein and two short asymmetric square wave signal, likewise according to one embodiment described herein.

FIG. 11B shows three square pulse sequences, 182, 184, and 186 having different symmetries. The topmost pulse sequence 182 shows a symmetrical square pulse sequence. The areas enclosed by the square wave signals and the dotted line, 188 and 190, respectively are identical above and below the average value 192 of the symmetrical square pulse control signal 182.

In the two other waveforms, the areas above and below the average value 192 differ. The area above the average value 192 is larger. Asymmetry can also be produced in the other direction in which the area below the average value 192 is greater.

It can be shown that asymmetry can be produced using various methods. For the middle case 184, the asymmetry is set using different amplitude levels, whereas in the bottom case 186, asymmetry is produced using different durations for the interval between slip phases.

Such asymmetry can compensate in the event that the amplifier electronics, the actuators and the mechanics might not be able to follow a fast step perfectly, which then lead to asymmetric behavior at the point of friction, which leads in turn to undesired vibrations.

Figure 12:
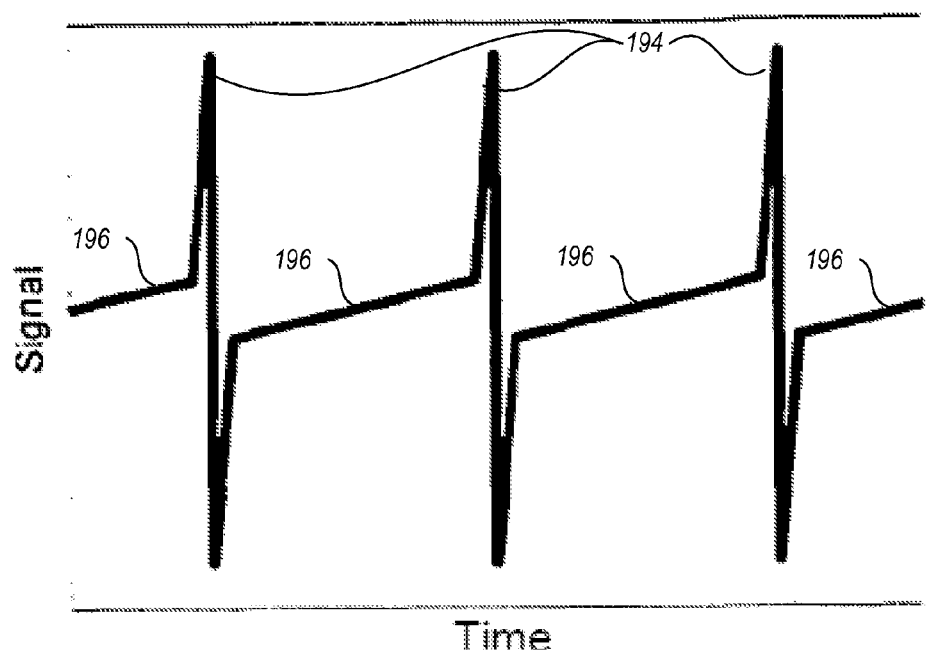
FIG. 12 shows a representation of a superimposed scanning motion having shortened sawtooth waveforms according to one embodiment described herein and FIG. 13 shows time-shifted control signals for a plurality of piezoelectric actuators using shortened sawtooth signals according to one embodiment described herein.

FIG. 12 shows sawtooth pulses 194 superimposed on a scanning movement. A slowing rising line 196, interrupted by the sawtooth pulses 194, can be seen. Such a control signal allows continuous scanning motion to be performed with a runner.

The scanning motion results from semi-static control that changes slowly in comparison with the edges of the step. Superimposition may be realized in such a way that a step is performed as soon as the scanning motion has reached a threshold value. After the step, the voltage applied to the actuator is again at the same level as before the first scan, so scanning can start anew. Because these cycles can be repeatedly performed, the possible stroke length is theoretically unlimited.

Figure 13:
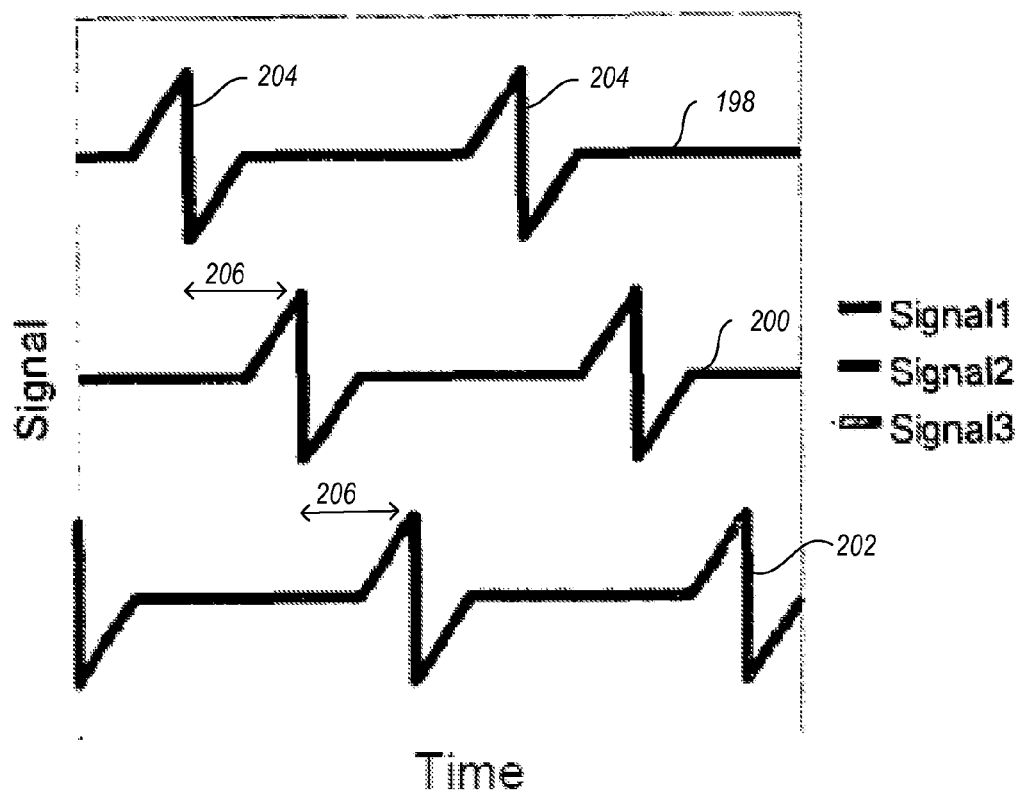

FIG. 13 shows shortened sawtooth waveforms 198, 200, and 202, with which a drive having three actuators, in this case, can be controlled. The sawteeth 204 are produced with the same frequency, but with a timing offset 206, so not all the actuators perform a step simultaneously. By means of such multi-actuator drives, it is possible to realize powerful actuators with very uniform operating behavior.

The invention claimed is:

1. A method for controlling an inertial drive on the basis of pulse trains that include sections having different gradients and having variable amplitude and frequency, the method comprising:
   providing pulse intervals of variable lengths between individual pulses, wherein a selected pulse duration is less than a cycle duration of a natural oscillation of a system to be driven;
   maintaining a constant pulse duration;
   determining a step frequency of a drive based on the variable lengths of the pulse intervals; and
   permitting continuous motion of the drive by superimposing a scanning motion and a step.

2. The method according to claim 1 wherein each pulse comprises a sequence having a first slowly rising edge, a rapidly falling edge and a second slowly rising edge, or having a first slowly falling edge, a rapidly rising edge and a second slowly falling edge.

3. The method according to claim 1 further comprising, when the drive changes direction, adjusting amplitude values to compensate for changing step sizes.

4. The method according to claim 3 further comprising readjusting the amplitude values to keep the step size constant.

5. The method according to claim 4 further comprising dynamically controlling the amplitude to maintain small step sizes less than 5 nm.

6. The method according to claim 1 further comprising:
   setting a drive speed based on a product of the step frequency and the step size; and
   filtering out resonant frequencies of the system to be driven.

7. The method according to claim 1, further comprising compensating mechanical and electrical properties of the system to be driven by pulse asymmetry in the respective pulse trains used for control.

8. The method according to claim 3, further comprising:
   correcting frequency-dependent variations in the step size by making adjustments to control amplitudes; and
   correcting the adjustments anticipatively, using a recorded series of measurements.

9. The method according to claim 3, further comprising:
   correcting frequency-dependent variations in the step size by making adjustments to control amplitudes; and
   correcting said adjustments dynamically.

10. The method according to claim 1 wherein more than one actuator is used per drive, the actuators selectively controllable by a timing offset.

11. The method according to claim 1 wherein the pulse duration of an individual pulse is less than 50 µs.

12. The method according to claim 1 wherein superimposing the scanning motion and the step includes performing the step when the scanning motion has reached a threshold value.

13. A method for controlling an inertial drive on the basis of pulse trains that include sections having different gradients and having variable amplitude and frequency, the method comprising:
   providing pulse intervals of variable lengths between individual pulses, wherein a selected pulse duration is less than a cycle duration of a natural oscillation of a system to be driven and wherein the selected pulse duration is at least one order of magnitude less than the cycle duration of a natural oscillation of the system to be driven.

14. The method according to claim 13 further comprising: when the drive changes direction, adjusting amplitude values to compensate for changing step sizes.

15. The method according to claim 14 further comprising readjusting the amplitude values to keep the step size constant.

16. The method according to claim 13, further comprising compensating mechanical and electrical properties of the system to be driven by pulse asymmetry in the respective pulse trains used for control.

17. The method according to claim 13, further comprising:
   correcting frequency-dependent variations in the step size by making adjustments to control amplitudes; and
   correcting the adjustments anticipatively, using a recorded series of measurements.

18. The method according to claim 13, further comprising:
   correcting frequency-dependent variations in the step size by making adjustments to control amplitudes; and
   correcting said adjustments dynamically.

* * * * *